United States Patent
Eaves (10) Patent No.: US 8,781,637 B2
(45) Date of Patent: Jul. 15, 2014

(54) SAFE EXPOSED CONDUCTOR POWER DISTRIBUTION SYSTEM

(71) Applicant: Voltserver Inc., Charlestown, RI (US)

(72) Inventor: Stephen S. Eaves, Charlestown, RI (US)

(73) Assignee: VoltServer Inc., Charlestown, RI (US)

( * ) Notice: Subject to any disclaimer, the term of this patent is extended or adjusted under 35 U.S.C. 154(b) by 0 days.

(21) Appl. No.: 13/707,842

(22) Filed: Dec. 7, 2012

(65) Prior Publication Data

US 2013/0103220 A1  Apr. 25, 2013

Related U.S. Application Data

(63) Continuation-in-part of application No. 12/911,710, filed on Oct. 25, 2010, now abandoned.

(60) Provisional application No. 61/255,463, filed on Oct. 27, 2009.

(51) Int. Cl.

| | |
|---|---|
| G05B 11/01 | (2006.01) |
| G05B 9/02 | (2006.01) |
| G06F 19/00 | (2011.01) |
| G05D 3/12 | (2006.01) |
| H02H 3/00 | (2006.01) |
| H02H 7/122 | (2006.01) |
| H02H 7/26 | (2006.01) |
| H02J 3/12 | (2006.01) |
| H02H 3/40 | (2006.01) |
| H02H 3/44 | (2006.01) |

(52) U.S. Cl.
CPC ... *H02J 3/12* (2013.01); *H02H 7/261* (2013.01); *H02H 3/40* (2013.01); *H02H 3/44* (2013.01)

USPC ......... 700/286; 700/21; 700/79; 700/177; 361/42; 361/59; 361/65; 361/83; 363/56.03; 363/56.04

(58) Field of Classification Search
USPC ......... 700/21, 22, 79, 177, 286, 292; 361/42, 361/59, 65, 83, 88, 93.1; 363/56.03, 56.04, 363/56.05
See application file for complete search history.

(56) References Cited

U.S. PATENT DOCUMENTS

| | | | | |
|---|---|---|---|---|
| 4,344,100 | A * | 8/1982 | Davidson et al. | 361/45 |
| 6,008,971 | A * | 12/1999 | Duba et al. | 361/64 |
| 6,218,930 | B1 | 4/2001 | Katzenberg et al. | |
| 7,873,441 | B2 * | 1/2011 | Synesiou et al. | 700/286 |
| 2003/0054777 | A1 * | 3/2003 | Hoctor | 455/108 |
| 2003/0058590 | A1 | 3/2003 | Gershen et al. | |
| 2004/0145840 | A1 * | 7/2004 | Langford et al. | 361/42 |
| 2006/0056118 | A1 * | 3/2006 | Huczko et al. | 361/6 |
| 2007/0001868 | A1 * | 1/2007 | Boaz | 340/870.02 |
| 2007/0005193 | A1 * | 1/2007 | Nelson et al. | 700/286 |
| 2007/0121261 | A1 | 5/2007 | Sung | |
| 2007/0217414 | A1 | 9/2007 | Berkman et al. | |

(Continued)

*Primary Examiner* — Darrin Dunn (57) ABSTRACT

A power distribution system (that can detect an unsafe fault condition where an individual or object has come in contact with the power conductors) regulates the transfer of energy from a source to a load. Periodically, the source controller opens an S1 disconnect switch, a and load controller opens an S2 disconnect switch. A capacitor represents the capacitance across the load terminals. If the capacitor discharges at a rate higher or lower than predetermined values after the S1 and S2 disconnect switches are opened, then a fault condition is registered, and the S1 and S2 switches will not be commanded to return to a closed position, thus isolating the fault from both the source and the load.

28 Claims, 9 Drawing Sheets

(56) References Cited

U.S. PATENT DOCUMENTS

| | | | |
|---|---|---|---|
| 2008/0107134 A1* | 5/2008 | Okazaki et al. | 370/479 |
| 2008/0211511 A1 | 9/2008 | Choi et al. | |
| 2009/0015434 A1 | 1/2009 | Fox et al. | |
| 2009/0040667 A1 | 2/2009 | DiSalvo et al. | |
| 2009/0187285 A1 | 7/2009 | Yaney et al. | |
| 2009/0229900 A1* | 9/2009 | Hafner et al. | 180/65.275 |
| 2010/0039741 A1 | 2/2010 | Booth et al. | |
| 2010/0217447 A1* | 8/2010 | Karam | 700/286 |
| 2011/0066296 A1 | 3/2011 | Nelson et al. | |
| 2011/0075304 A1* | 3/2011 | Hamer | 361/47 |
| 2011/0316355 A1 | 12/2011 | Gruber et al. | |
| 2012/0075759 A1 | 3/2012 | Eaves | |

* cited by examiner

SAFE EXPOSED CONDUCTOR POWER DISTRIBUTION SYSTEM

CLAIM OF PRIORITY

This application is a continuation in part of U.S. application Ser. No. 12/911,710, entitled, "Safe Exposed Conductor Power Distribution System", filed on Oct. 25, 2010, naming Stephen Eaves of Charlestown, R.I. as inventor. This application also claims priority to U.S. Application No. 61/255,463, entitled, "Safe Exposed Conductor Power Distribution System", filed on Oct. 27, 2009, naming Stephen Eaves of Charlestown, R.I. as inventor. The contents of both of these applications are herein incorporated by reference in their entirety.

FIELD OF INVENTION

This invention relates to power distribution system safety protection devices—for example, power distribution systems with electronic monitoring to detect and disconnect power in the event of an electrical fault or safety hazard, particularly where an individual has come in contact with exposed conductors. This invention is applicable to general power distribution, or more specifically to electric vehicle charging, telecommunications or alternative energy power systems.

BACKGROUND

In a typical power distribution application, power from a central source is distributed through a number of branch circuits to a load device. The branch circuits are equipped with protection devices, such as circuit breakers or fuses. During an electrical fault, such as a short circuit, the protection devices are designed to detect an abnormally high level of current and to disconnect or interrupt the source from the load before causing damage or fire to the distribution system.

The introduction of the Ground Fault Interrupter (GFI) added electrocution protection to the distribution system by detecting an imbalance between phase currents in a particular branch circuit, indicating that current is flowing through an alternate ground path and possibly in the process of electrocuting an individual.

However, there are significant shortcomings in traditional distribution protection methods. For example, a fire could still occur from a loose connection. In this case, the resistance of a live connection increases and heats up to the point of igniting surrounding materials. This heat build-up could occur at electrical currents well below the trip point of the branch circuit protection devices. In the case of GFI protection, the GFI circuit can only protect an individual that comes in contact with both a line conductor and a ground point, such as would be the case if an individual touched a live electric conductor with one hand and a sink faucet with the other hand. However, if the individual manages to touch both a live conductor and a return path (such as across the "hot" and neutral conductors of a home outlet) the GFI would not activate and the person would receive a shock.

Another important concept is a metric used to relate the lethality of an electric shock to the duration and magnitude of a current pulse flowing through the body. One metric used to describe this relationship by electrophysiologists is known as the chronaxie; a concept similar to what engineers refer to as the system time constant. Electrophysiologists determine a nerve's chronaxie by finding the minimal amount of electrical current that triggers a nerve cell using a long pulse. In successive tests, the pulse is shortened. A briefer pulse of the same current is less likely to trigger the nerve. The chronaxie is defined as the minimum stimulus length to trigger a cell at twice the current determined from that first very long pulse. A pulse length below the chronaxie for a given current will not trigger a nerve cell. The invention of this disclosure can take advantage of the chronoxie principle to keep the magnitude and duration of the energy packet to be safely below the level that could cause electrocution.

Electrocution is the induction of a cardiac arrest by electrical shock due to ventricular fibrillation (VF). VF is the disruption of the normal rhythms of the heart. Death can occur when beating of the heart becomes erratic, and blood flow becomes minimal or stops completely. McDaniel, et al., in the paper "Cardiac Safety of Neuromuscular Incapacitating Defensive Devices", Pacing and Clinical Electrophysiology, Volume 28, Number 1, January 2005, provides a conservative reference for estimating the minimum electrical charge necessary to induce VF under conditions similar to those of the disclosed invention. The study was performed to investigate the safety aspects of electrical neuromuscular incapacitation devices commonly used by law enforcement agencies for incapacitating violent suspects. McDaniel measured the response of a series of pigs to multiple, brief (150 μs) electrical pulses applied to the thorax of the animals. In these tests, a threshold charge of 720 μC could induce VF in a 30 kg animal. The barbed darts were placed on the surface of the animal in close proximity to the heart and penetrated enough to bypass the normal insulating barrier of the skin. This results in a body resistance as low as 400 Ohms. In comparison, the U.S. Occupational Safety and Health Agency (OSHA) describes the resistance of wet human skin to be approximately 1000 Ohms.

By carefully monitoring the transfer of electrical energy contained sent by a source to a load device, it can be determined if some other mechanism, such as an external short circuit, or person receiving a shock, has affected the transfer of energy. The transfer can then be interrupted to protect the equipment or personnel. If the period of a current pulse is below the muscle chronaxie, human skeletal or heart muscles will be much less affected by the pulse. The avoidance of a building or equipment fire is also critical, but the level of energy to cause a fire is normally much less than that which would cause cardiac arrest. The disclosed invention can monitor and control the transfer of energy in small increments, and can thus offer additional safety over what can be provided even by the combination of a circuit breaker and a ground fault interrupter.

Figure 3A:
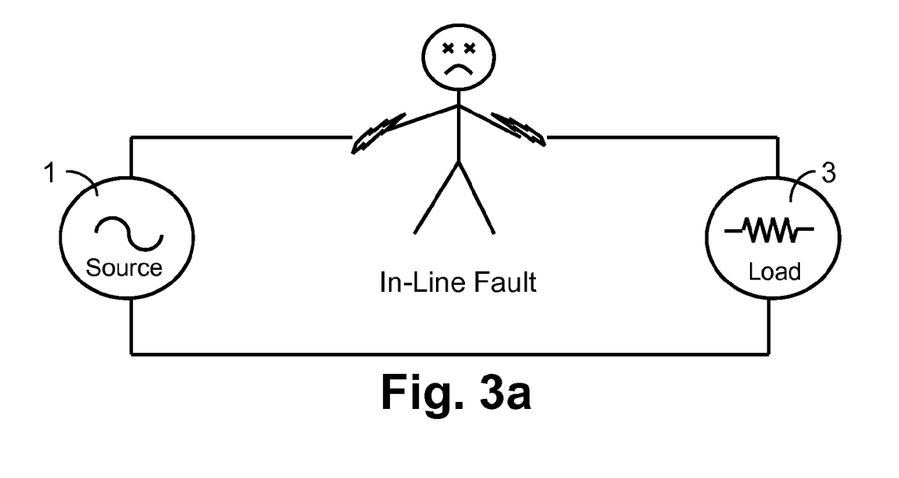
FIG. 3a is a diagram depicting an in-line, or series shock hazard.
Figure 3B:
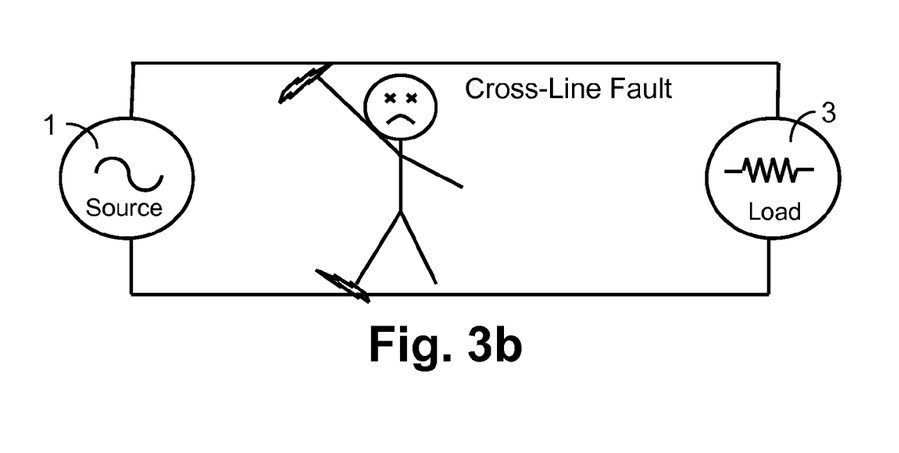
FIG. 3b is a diagram depicting a cross-line of parallel shock hazard.

There are two primary fault modes to be detected. The first mode is an in-line or series fault where an abnormal resistance is put in series with the path between the source and load, as is illustrated by the individual being shocked in FIG. 3a. The second fault mode is a cross-line or parallel fault as is illustrated in FIG. 3b. The in-line fault can be detected by an abnormal drop in voltage between the source and load points for a given electrical current. In the disclosed invention, the cross line fault can be detected by a reduction in impedance between the output conductors after they have been isolated from both the source and the load by electronic switching.

SUMMARY

Figure 1:
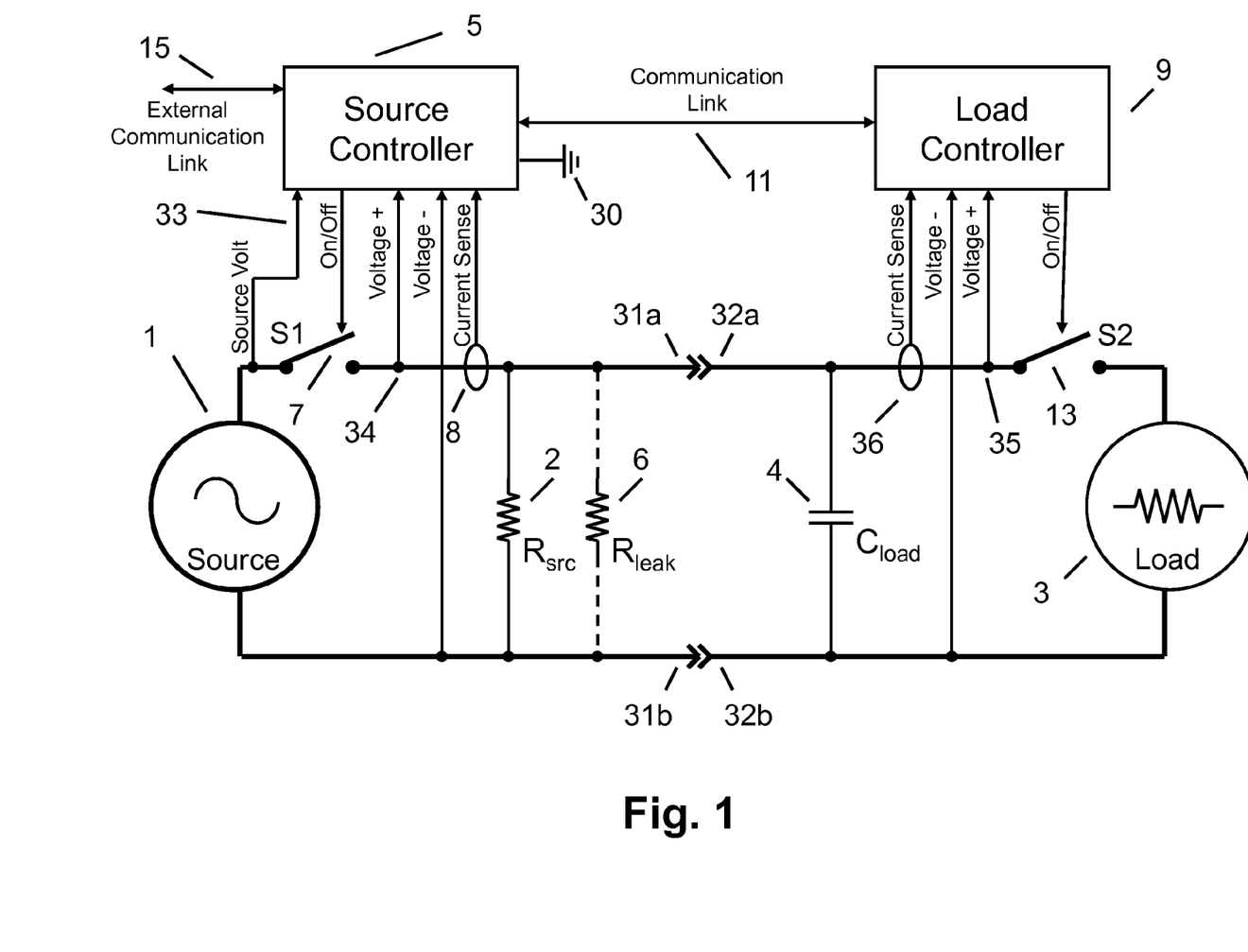
FIG. 1 is a block diagram of an embodiment of the safe power distribution system.

A block diagram of an embodiment of the power distribution system is shown in FIG. 1. The power distribution system regulates the transfer of energy from a source 1 to a load 3. Periodically, the source controller 5 opens the S1 disconnect switch 7 for a predetermined time period, known as the "sample period". Capacitor $C_{load}$ 4 is electrically connected to the load terminals. The capacitor stores the voltage present on load terminals 32a, 32b that existed just prior to the moment that S1 is opened; references to "voltage" here and in the claims also include current and/or other parameters that vary with voltage. The resistance between the source terminals is represented by $R_{src}$ 2. In a particular embodiment, $R_{src}$ has a value between 10 thousand to 10 million Ohms.

During normal conditions, when S1 is opened, the voltage across capacitor $C_{load}$ will decay as it discharges through $R_{src}$ and into the load. Switch S2 13 isolates $C_{load}$ from the load circuit. S2 can take any of a number of forms, ranging from a non-controllable diode to a controllable bi-directional solid state switch, as will be discussed later in the detailed description section. At this point, the source terminals 31a, 31b and load terminals 32a, 32b are electrically isolated from source 5 and load 9. The only discharge path for the capacitance represented by $C_{load}$ should be the source terminal resistance $R_{src}$. However, during a cross-line fault, depicted in FIG. 3b, the resistance of a foreign object, such as a human body or conductive element, is introduced and is represented by $R_{leak}$ 6. The parallel combination of $R_{src}$ and $R_{leak}$ will increase the voltage decay rate of $C_{load}$ significantly. The voltage on $C_{load}$ just prior to S1 being opened is measured by the source controller 5. At the end of the predetermined sample period, just prior to where S1 is commanded back to a closed (conducting) state, the voltage of $C_{load}$ is measured again and compared to the measurement that was made just prior to the beginning of the sample period.

Figure 4:
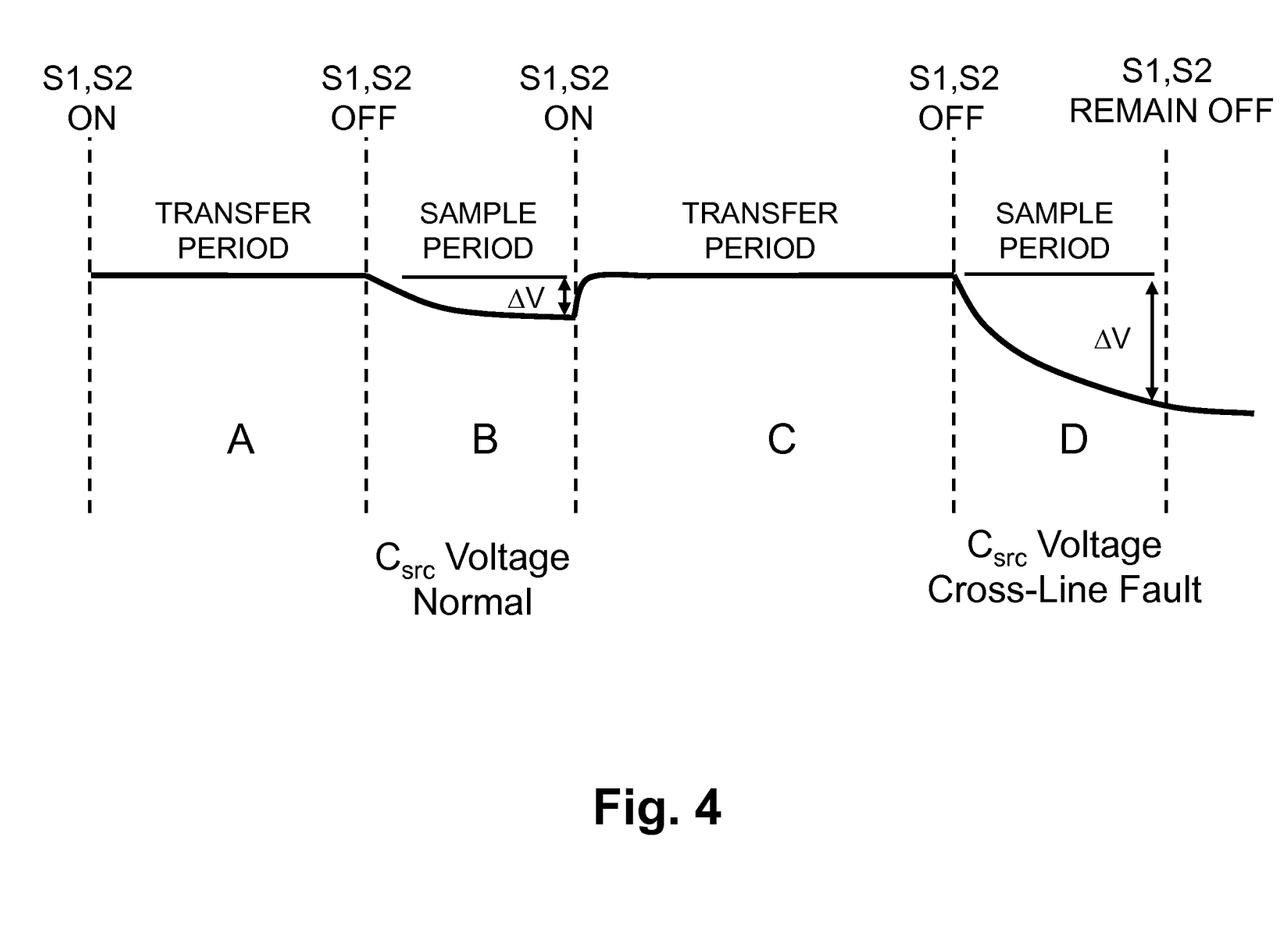
FIG. 4 is a diagram showing the voltage on the power distribution system output conductors with a direct current (DC) source.
Figure 5:
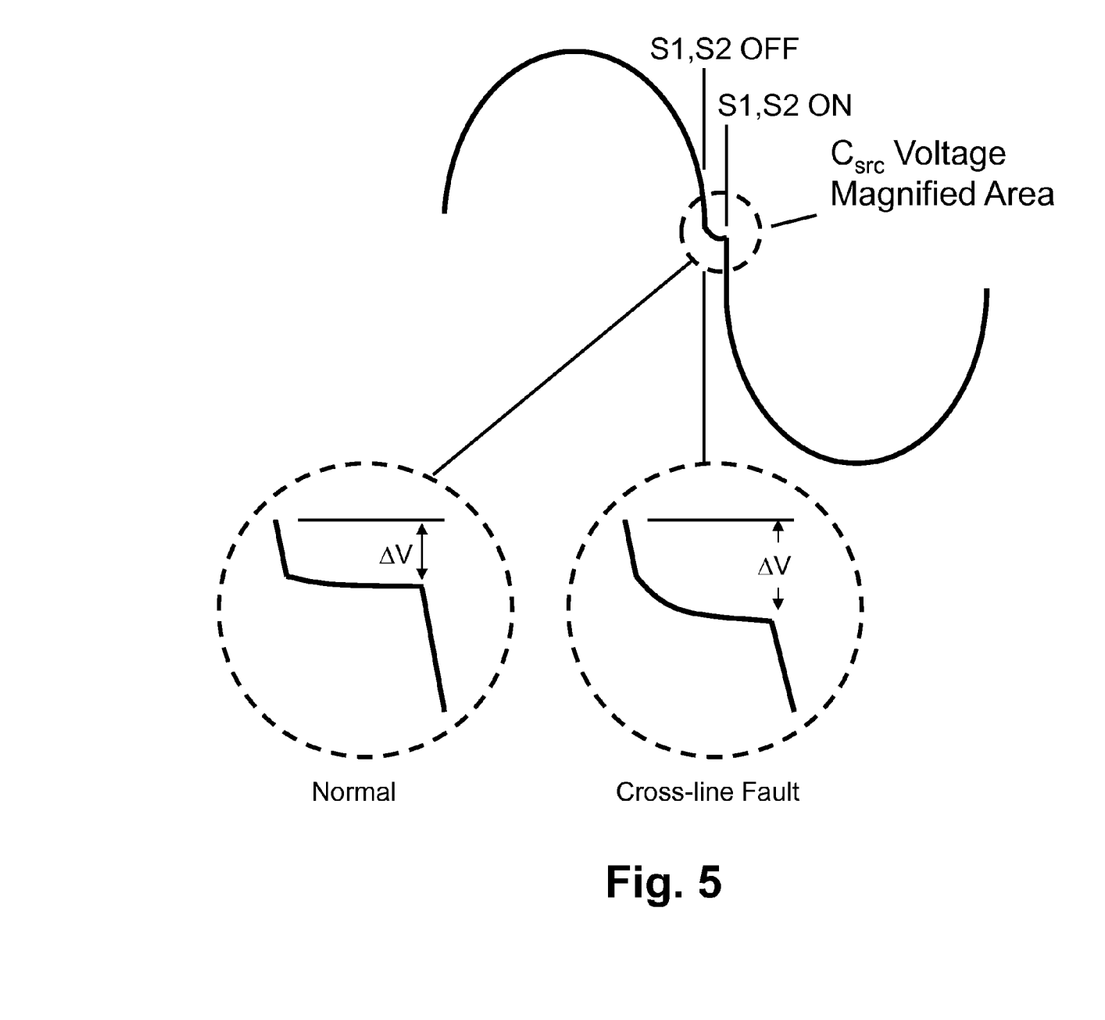
FIG. 5 is a diagram showing the voltage on the power distribution system output conductors with an alternating current (AC) source.

If the voltage across $C_{load}$ has decayed either too quickly or too slowly, a fault is registered and S1 will not be returned to a closed position. If S2 is a controllable version, it will also remain in an open (non-conducting) state. A high decay rate indicates a cross-line fault, as depicted in FIG. 3b. A low decay rate indicates an in-line fault, as depicted in FIG. 3a. In a distribution system where DC power is being transferred, the difference in the voltage decay rate on $C_{load}$ during normal operation and when there is a cross-line fault is depicted in FIG. 4. In a distribution system where AC power is being transferred, the difference in voltage decay rate on $C_{load}$ during normal operation and when there is a cross-line fault is depicted in FIG. 5.

If there are no fault conditions, S1 is again commanded to a closed (conducting) state and S2, if a controllable version is commanded to a conducting state. Energy is then transferred between the source and load until the next sample period. The conducting period between sample periods is referred to as the "transfer period".

An additional check for the in-line fault depicted in FIG. 3a is where the source and load controllers acquire their respective terminal voltages at sensing points 34,35 of FIG. 1 during an energy transfer period. In embodiments incorporating advanced monitoring options, communication link 11 will be implemented and the source controller will obtain the load terminal voltage through the communication link. The source controller then calculates the voltage difference between the two measurements. The source controller also acquires the electrical current passing through the source terminals using a current sensor 8. The source controller can now calculate the line resistance between the source and load terminals using Ohms law, or the relationship: Resistance=Voltage/Current. The calculated line resistance is compared to a predetermined maximum and minimum value. If the maximum is exceeded, S1 and S2 (if a controllable version) are immediately opened and an in-line fault is registered. A line resistance that is lower than expected is also an indication of a hardware failure.

Figure 8:
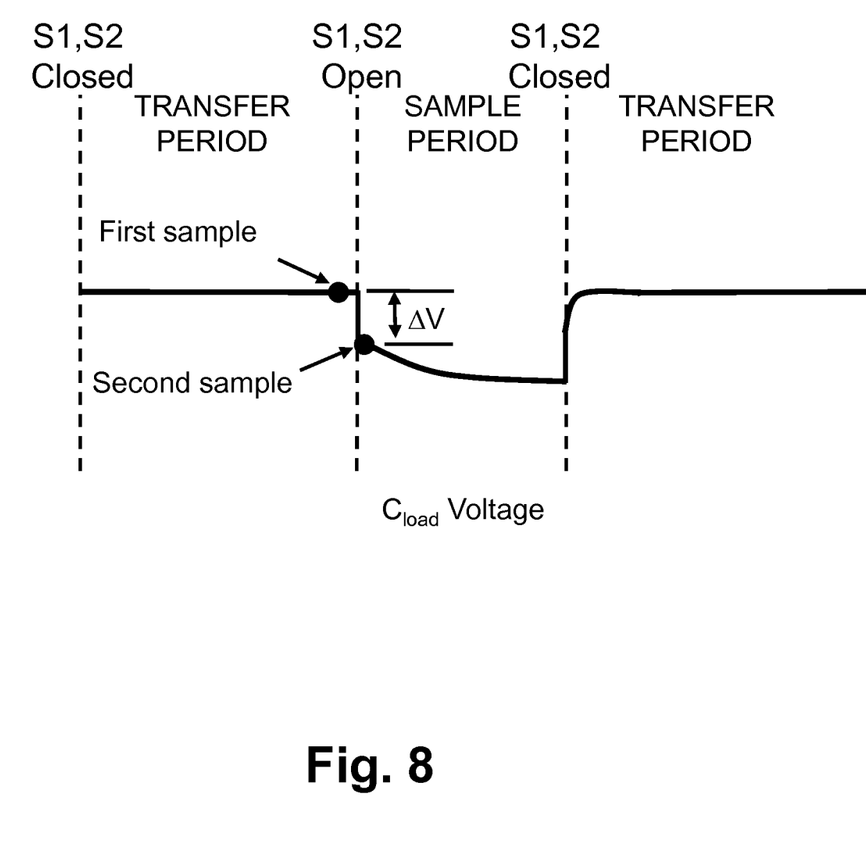
FIG. 8 is a diagram of the source voltage waveform depicting voltage sampling for an in-line resistance calculation.

An alternative method to measure in in-line resistance without a communications link to the load is where the source controller measures the source terminal voltage at sensing point 34 and the electrical current passing through the source terminals using a current sensor 8. The voltage and current samples are made nearly simultaneously during the same energy transfer period. Disconnect switch S1 is then opened and the source controller takes another voltage sample at sensing point 34. The sample is taken immediately after S1 is opened. The difference in magnitude between the first and second voltage samples is proportional to the line resistance. As depicted in FIG. 8, the voltage drop between the first and second voltage samples is independent of the normal, slower decay in voltage that occurs for the remainder of the sample period because the second voltage sample is taken before the voltage on $C_{load}$ has time to decay significantly.

DETAILED DESCRIPTION

The foregoing and other features and advantages of various aspects of the invention(s) will be apparent from the following, more-particular description of various concepts and specific embodiments within the broader bounds of the invention (s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

There are a number of industry standard methods for constructing the S1 and S2 disconnect switches 7, 13 of FIG. 1. In one embodiment, the construction of S1 and S2 is determined based on whether the system is distributing DC or AC power and whether the load-side switch is controllable or a simple diode. For DC power distribution, where the load controller is able to control the action of S2, a DC disconnect switch arrangement 37 of FIG. 6a can be used. In this arrangement, electrical current is blocked in the minus-to-positive direction by blocking diode 39.

Figure 6A:
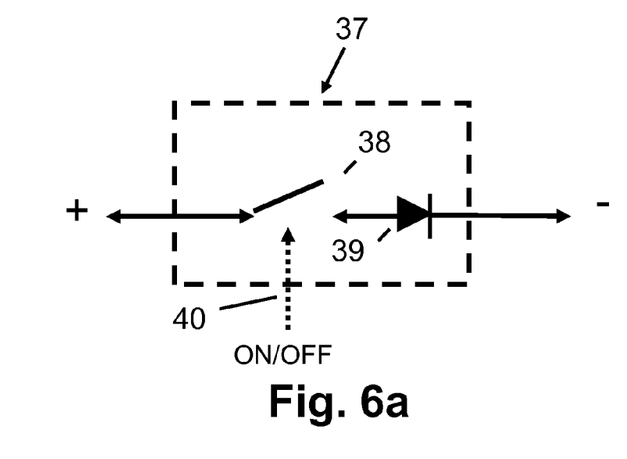
FIG. 6a is a diagram of a DC disconnect switch constructed using a uni-directional switch arrangement with a blocking diode.

Current flow in the positive-to-negative direction is controlled by internal switch 38 according to the application of control signal 40. Controllable switch 38 provides the capability for the load controller to interrupt power in cases where an unauthorized source of power has been connected to the load terminals or where the source controller malfunctions and can no longer interrupt power from source 1. In applications such as battery charging, uncontrolled overcharging can result in battery damage or fire, thus making a controllable load disconnect switch advantageous. The transistor type used for internal switch 38 is chosen based on the voltage and current requirements. Industry standard transistors that can be used include FETs, IGBTs or IGCTs. The electrical implementation of control signal 40 for controlling the conduction of internal switch 38 is dependent on the type of transistor but is well known to those skilled in the art of power electronics.

Figure 6B:
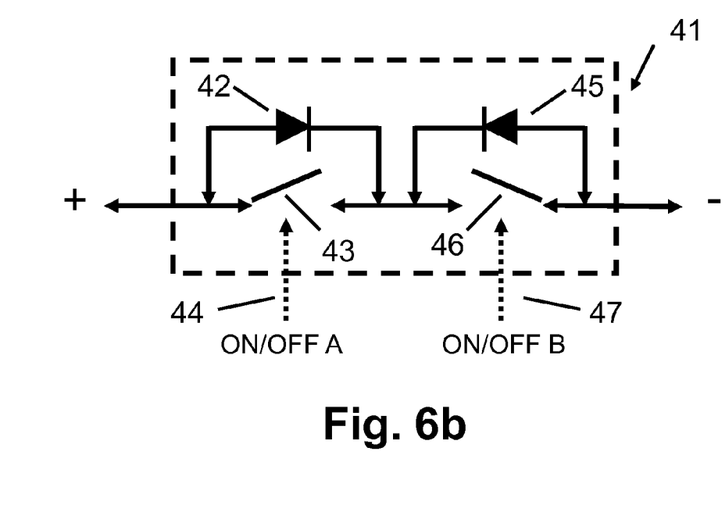
FIG. 6b is a diagram of an AC disconnect switch constructed using a bi-directional switch arrangement.
Figure 6C:
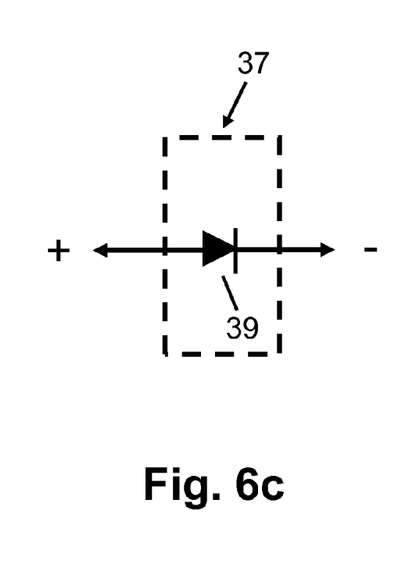
FIG. 6c is a diagram of a uni-directional DC disconnect switch constructed with only a diode.

In cases where it is not necessary for load controller 9 to have the ability to interrupt power to the load terminals, internal switch 38 can be constructed as shown in FIG. 6c using only diode 39 to block electrical current from back-flowing from the load circuit into load capacitor $C_{load}$ 4.

For AC power distribution, the AC disconnect switch arrangement 41 of FIG. 6b can be used. In this arrangement, internal switches 43 or 46 acting independently can block electrical current in only one direction since current flow in the opposite direction of each switch is allowed by bypass diodes 42 or 45. However, by the combined action of ON/OFF control signals 44, 47 electrical current through disconnect switch 41 can be blocked in either direction or in both directions. To block current flow in both directions, control signals 44, 47 are both set to the OFF state, placing internal switches 43, 46 in an open (non-conducting state). To allow current flow in the positive-to-negative direction, while blocking flow in the negative-to-positive direction, internal switch 46 is placed in a closed (conducting) state. Electrical current is then free to flow from the positive terminal through bypass diode 42, through internal switch 46 and out the negative terminal. Conversely, to allow current flow in the negative-to-positive direction, while blocking the flow in the positive-to-negative direction, internal switch 43 is placed in a closed (conducting) state. Electrical current is then free to flow from the negative terminal through bypass diode 45 through internal switch 43 and out the positive terminal. The transistor types used to implement internal switches 43, 46 are chosen based on the electrical voltage and current requirements. Industry standard transistors that can be used include FETs, IGBTs or IGCTs. The electrical implementation of control signals 44, 47 for controlling the conduction of internal switches 43, 46 is dependent on the type of transistors used, but is well known to those skilled in the art of power electronics.

Figure 2:
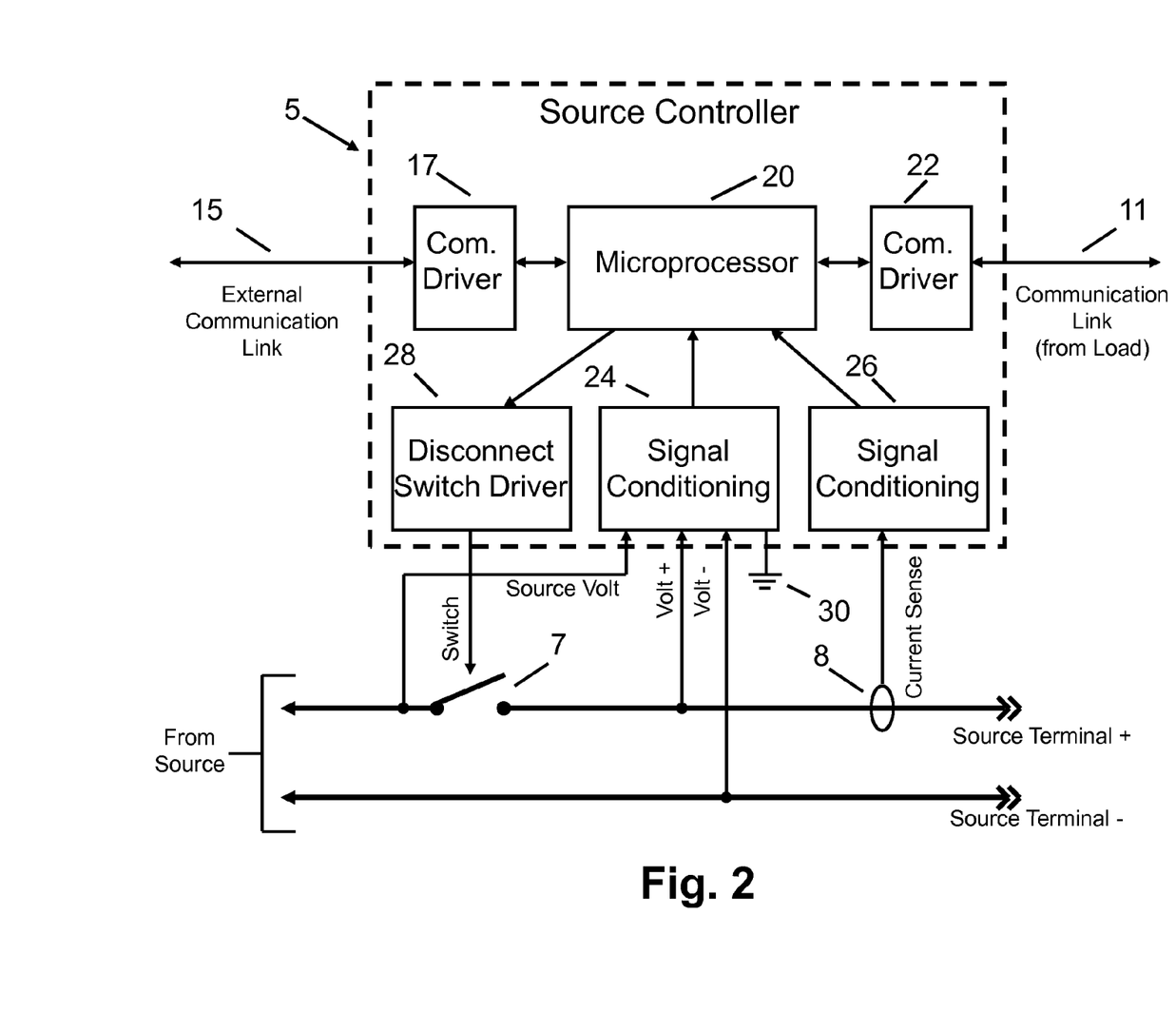
FIG. 2 is a more detailed block diagram of an embodiment of the source controller.

As shown in FIG. 2, source controller 5 includes microprocessor 20, communication drivers 17, 22 and signal conditioning circuits 24, 26, 28. The load controller 9 of FIG. 1 is similar in construction to the source controller but is configured with different operating software to perform the functions described in the operation sequence section, below. Referring to FIG. 1, before beginning operation, self-check and initialization steps are performed in steps (a),(b) and (c). S1 disconnect switch 7 and S2 disconnect switch 13 (if controllable) are commanded to remain in an open (non-conducting) state during initialization.

Operational Sequence a) Referring to FIG. 1, the source controller 5 verifies that the source voltage at point 33 is within a predetermined expected value and that there is no current flowing in the source power conductors, as reported by the current sensor 8. The source controller 5 also performs a built-in testing algorithm, as is typical in the industry, to verify that its hardware and firmware is functioning properly.

b) If the embodiment incorporates advanced monitoring options, a communication check is performed by the source controller through communication link 11 to load controller 9. For distribution systems that provide secured energy transfer, the source controller 5 will expect a digital verification code that matches a predetermined value to ensure that the source and load equipment are electrically compatible and authorized to receive power before energy transfer is initiated. For example, a verification code may be necessary for applications where the energy is being purchased. The source controller 5 sends a request via communication link 11 to the load controller 9 asking it for its status. The load controller 9 responds with the value of voltage and current on its conductors and any fault codes. The source controller 5 verifies that the load voltage is within a predetermined value and that there is no current flowing in the load power conductors (indicating a possible failed source disconnect, failed current sensors or other hardware problem). The load controller 9 also performs built-in testing algorithms, as is typical in the industry, to verify that its hardware and firmware are functioning properly. If there is no fault registered, the sequence progresses to step (c). If a fault is registered, the sequence is repeated starting at step (a).

c) Source controller 5 makes another measurement of the source voltage at point 33 to determine the duration of the transfer period, where energy will be transferred from the source to the load. The higher the source voltage, the higher the potential fault current, and hence the shorter the transfer period. The source voltage measurement is applied to an internal table or function in the processor of the source controller 5 to determine a safe duration value for the transfer period. The use of a variable transfer period is not required for the operation of the disclosed invention, but will make energy transfer more efficient and less prone to false alarms, since the number of measurements can be maximized and the amount of switching instances can be minimized according the length of the period. The alternative is to maintain a fixed duration transfer period that is configured for the highest possible source voltage and for the worst-case safety conditions.

d) Following the determination of the transfer period, the source controller 5 closes switch S1. If the load circuit incorporates a controllable disconnect switch, the load controller 9 will sense the rapid increase in voltage across capacitor $C_{load}$ 4 measured by voltage sensor at point 35, and immediately close switch S2 13. No action is necessary if the load circuit uses a diode as a disconnect switch. Both controllers 5, 9 continue to measure voltage and current at their respective terminals.

e) At the end of the transfer period, the sample period begins. The source controller 5 measures the voltage across $C_{load}$ at point 34 and then opens switch S1. If the load circuit incorporates a controllable disconnect switch, the load controller 9 senses the rapid decrease in voltage across $C_{load}$ when S1 is opened and immediately opens switch S2. No action is necessary from the load controller 9 if it is employing a diode as a disconnect switch.

f) Immediately after S1 is opened, the source controller measures the voltage across $C_{load}$ at point 34 and the current through the source terminals using the current sensor 8. If the current value is not approximately zero, a hardware fault is registered, disconnect switch S1 is left in an open state, and the sequence skips to step (j). If there is no fault registered, the operational sequence continues to step (g).

g) The source controller 5 calculates the line resistance from the voltage and current samples acquired in step (d),(e),(f) using one of the two methods described above in the Summary section. If there is no serial communication employed between the source and load controllers, the difference in voltage at point 34 of FIG. 1 before and immediately after S1 is opened is divided by current to calculate line resistance. If the source and load controller 5, 9 are equipped with serial communications, the source controller 5 can request the load voltage reading from the load controller 9 to calculate the voltage difference between the source side and the load side. Dividing the voltage difference by current returns a value for line resistance. If the line resistance is greater than a predetermined maximum value, an in-line fault is registered by the source controller 5. A calculated line resistance less than a predetermined minimum value is indicative of a hardware failure. If a fault is registered, the source controller 5 immediately opens S1 and proceeds to step (j). If there are no faults registered, the sequence progresses to step (h).

h) Switch S1 remains in the open state until the end of the sample period. At the end of the sample period, but before S1 is closed again, the source controller measures the voltage of $C_{load}$ at point 34, and compares the voltage reading to the voltage reading that was acquired at the beginning of the sample period. If the voltage has decayed too quickly by being less than a first predetermined value, then a cross-line fault is registered. If it has decayed too slowly and has failed to drop to less than a second predetermined value, it is an indication that the line resistance may be too high or that there is a hardware failure. If a fault has been registered, the sequence skips to step (j). If there are no faults registered, the operational sequence continues on to step (i).

i) If there are no faults registered, the operational sequence repeats, starting at step (c); otherwise, the sequence continues to step (j) below.

j) The power distribution system is in a faulted state due to an in-line fault, cross-line fault or hardware failure. In particular embodiments, the system will allow configuration of either an automatic reset or manual reset from a faulted state. If the system is configured for manual reset, it will remain with the S1 switch open until an outside system or until an operator initiates a restart. The system will then restart the operational sequence from step (a). If the system is configured for automatic restart, then a delay period is executed by the source controller to limit stress on equipment or personnel that may still be in contact with the power distribution conductors. In particular embodiments, the period is from 1 to 60 seconds. The system then restarts the operational sequence from step (a). For an additional level of safety, mechanical contactors may be included in series with S1 and/or S2 to act as redundant disconnects in the event that either S1 or S2 have malfunctioned.

SUMMARY, RAMIFICATIONS AND SCOPE

Described herein is a novel power distribution system that can safely transfer energy from a source to a load while overcoming the deficiencies of conventional circuit protection devices and ground fault interrupters.

In its simplest form, the present invention can be configured to only sense a cross-line fault such as would occur if an individual simultaneously touches both link conductors. In this case, only the voltage across the source terminals in position 34 of FIG. 1 are measured to recognize the fault.

In the preferred embodiment, where the load disconnect device is controllable, as described above in the Summary, section, a "sample period" is initiated by opening source disconnect switch S1 7 of FIG. 1. Load controller 9 senses the rapid voltage drop on $C_{load}$ when S1 is opened and immediately opens disconnect switch S2 13 to begin the sample period. Using communication link 11, the action of opening S2 can be initiated by the source controller 5 sending a communication command to the load controller 9 and by the load controller 9 commanding the load disconnect device to an open or closed state rather than having the load controller 9 sense the voltage drop on $C_{load}$ as the trigger to open the load disconnect device.

The components $C_{load}$ 4 and $R_{src}$ 2 of FIG. 1 respectively represent the capacitance and resistance, as seen at the source 31a, 31b and load terminals 32a, 32b when switch S1 7 and S2 13 are in an open (non-conducting state). In particular embodiments, these components are discrete components, of known value, placed across the source and load terminal conductors. However, the capacitance and resistance of the conductors, even without the discrete components, have an intrinsic value of resistance and capacitance due to their physical construction. In some instances, the system can be operated by programming the source controller 5 with these intrinsic values, thus negating a need to install discrete resistor and capacitor components.

In some applications, energy may flow from the load device 3 to the source device 1, as exemplified in a "grid-connected" application, such as a home with an alternative energy source, such as a photovoltaic solar array. At night, the home would act as the load device 3 with the utility grid being the source of energy; but, during the day, the home may become a source 1 rather than a load 3 when it generates solar electricity to be sold back to the grid. In such a case, the operation of the system is essentially the same as what was described, above, in the detailed description. Since the source and load controllers 5, 9 detect both the magnitude and polarity of the electrical current and voltage within the power distribution system, the source controller 5 inherently starts executing this new mode of operation. For example, as described in the detailed operation section, the voltage drop in the power-distribution-system conductors is calculated by multiplying the line current by a worst-case line resistance. When the load starts supplying power rather than sinking power, the polarity of electrical current will reverse and the line drop calculation will still be valid.

Source controller 5 and load controller 9 can include a logic device, such as a microprocessor, microcontroller, programmable logic device or other suitable digital circuitry for executing the control algorithm. The load controller 9 may take the form of a simple sensor node that collects data relevant to the load side of the system. It does not necessarily require a microprocessor.

The controllers 5 and 9 can be computing devices and the systems and methods of this disclosure can be implemented in a computing system environment. Examples of well-known computing system environments and components thereof that may be suitable for use with the systems and methods include, but are not limited to, personal computers, server computers, hand-held or laptop devices, tablet devices, smart phones, multiprocessor systems, microprocessor-based systems, set top boxes, programmable consumer electronics, network PCs, minicomputers, mainframe computers, distributed computing environments that include any of the above systems or devices, and the like. Typical computing system environments and their operations and components are described in many existing patents (e.g., U.S. Pat. No. 7,191,467, owned by Microsoft Corp.).

The methods may be carried out via non-transitory computer-executable instructions, such as program modules. Generally, program modules include routines, programs, objects, components, data structures, and so forth, that perform particular tasks or implement particular types of data. The methods may also be practiced in distributed computing environments where tasks are performed by remote processing devices that are linked through a communications network. In a distributed computing environment, program modules may be located in both local and remote computer storage media including memory storage devices.

The processes and functions described herein can be non-transitorially stored in the form of software instructions in the computer. Components of the computer may include, but are not limited to, a computer processor, a computer storage medium serving as memory, and a system bus that couples various system components including the memory to the computer processor. The system bus can be of any of several types of bus structures including a memory bus or memory controller, a peripheral bus, and a local bus using any of a variety of bus architectures.

The computer typically includes one or more a variety of computer-readable media accessible by the processor and including both volatile and nonvolatile media and removable and non-removable media. By way of example, computer-readable media can comprise computer-storage media and communication media.

The computer storage media can store the software and data in a non-transitory state and includes both volatile and nonvolatile, removable and non-removable media implemented in any method or technology for storage of software and data, such as computer-readable instructions, data structures, program modules or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed and executed by the processor.

The memory includes computer-storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processor.

The computer may also include other removable/non-removable, volatile/nonvolatile computer-storage media, such as (a) a hard disk drive that reads from or writes to non-removable, nonvolatile magnetic media; (b) a magnetic disk drive that reads from or writes to a removable, nonvolatile magnetic disk; and (c) an optical disk drive that reads from or writes to a removable, nonvolatile optical disk such as a CD ROM or other optical medium. The computer-storage medium can be coupled with the system bus by a communication interface, wherein the interface can include, e.g., electrically conductive wires and/or fiber-optic pathways for transmitting digital or optical signals between components. Other removable/non-removable, volatile/nonvolatile computer storage media that can be used in the exemplary operating environment include magnetic tape cassettes, flash memory cards, digital versatile disks, digital video tape, solid state RAM, solid state ROM, and the like.

The drives and their associated computer-storage media provide storage of computer-readable instructions, data structures, program modules and other data for the computer. For example, a hard disk drive inside or external to the computer can store an operating system, application programs, and program data.

The source and load controllers 5, 9 can be used to meter energy transfer and communicate the information back to the user or a remote location. For example, the disclosed invention can be implemented on an electric vehicle public charging station and can be utilized to send electricity consumption back to a central credit card processor. The transfer of information can be through an outside communication link 15, as depicted in FIG. 1. A user can also be credited for electricity that is transferred from his electric vehicle and sold to the power grid. The outside communication link 15 can also be used to transfer other operational information. For example, an electric vehicle can have contacts under its chassis that drop down make connection to a charging plate embedded in a road surface. The communication link 15 can transfer proximity information indicating that the car is over the charging plate. The information can inhibit energizing the charger plate unless the car is properly positioned.

The source disconnect device 7 can be supplemented by the addition of an electromechanical relay or "contactor" providing a redundant method to disconnect the source 1 from the source terminals so as to provide a back-up in the case of a failure of the source disconnect device 7. The load disconnect device 13 can be supplemented by an electromechanical relay or contactor in the same fashion. The electromechanical contactor activation coils can be powered by what is known to those skilled in the art as a "watchdog circuit". The watchdog circuit continually communicates with by the source or load controllers 5, 9; otherwise, the contactor will automatically open, providing a fail-safe measure against "frozen" software or damaged circuitry in the controllers 5, 9.

The source controller 5 can be programmed with an algorithm that adjusts the ratio of time that the source disconnect device 7 is conducting in respect to the time that it is not conducting in order to regulate the amount of energy transfer from the source 1 to the load 3. This method is well known to those skilled in the art as "pulse width modulation".

Data communications link 11 and/or external communication link 15 can be implemented using various methods and protocols well known to those skilled in the art. Communication hardware and protocols can include RS-232, RS-485, CAN bus, Firewire and others. The communication link 11 can be established using copper conductors, fiber optics or wirelessly over any area of the electromagnetic spectrum allowed by regulators, such as the Federal Communications Commission (FCC), as set forth in Part 18 of the FCC Rules. Wireless communication can be established using any of a number of protocols well known to those skilled in the art, including Wi-Fi, IRDa, Wi-Max and others. The data communications link 11 can communicate operating information between the source controller and the load controller, wherein the operating information includes at least a value indicative of the voltage across the load terminals that is acquired by the load controller.

Figure 7:
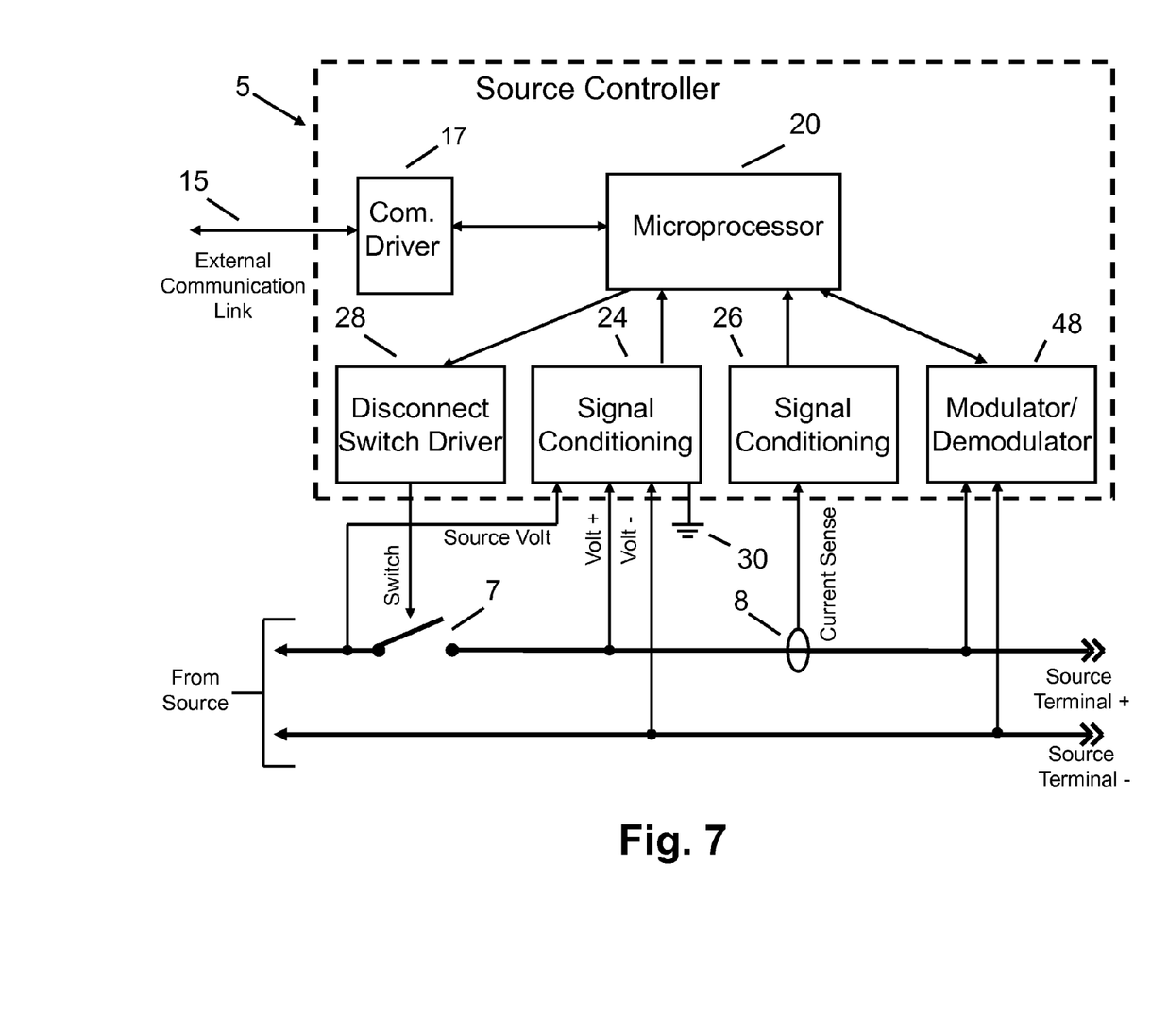
FIG. 7 is a diagram of an alternate source controller configuration that includes a modulator/demodulator for communications over power lines.

Another option for implementing the functions of communication link 11 and/or external communication link 15 of FIG. 1 is what is referred to those skilled in the art as "communication over power lines", or "communication or power line carrier" (PLC), also known as "power line digital subscriber line" (PDSL), "mains communication", or "broadband over power lines" (BPL). Referring to the revised source controller of FIG. 7, communication signals generated by microprocessor 20 are superimposed on the source terminals using a modulator/demodulator 48. The hardware and software methods of modulator/demodulator 48 are well known to those skilled in the art. Although the source controller is used as an example, an identical implementation of the modulator/demodulator 48 can be contained in the load controller, allowing bidirectional communication between the source and load controller. The transmitting side, either the source or load, combines the communication signals with the power waveform on the source or load terminals. The receiving side, either the source or the load, would then separate the communication signals from the power waveform.

Figure 9:
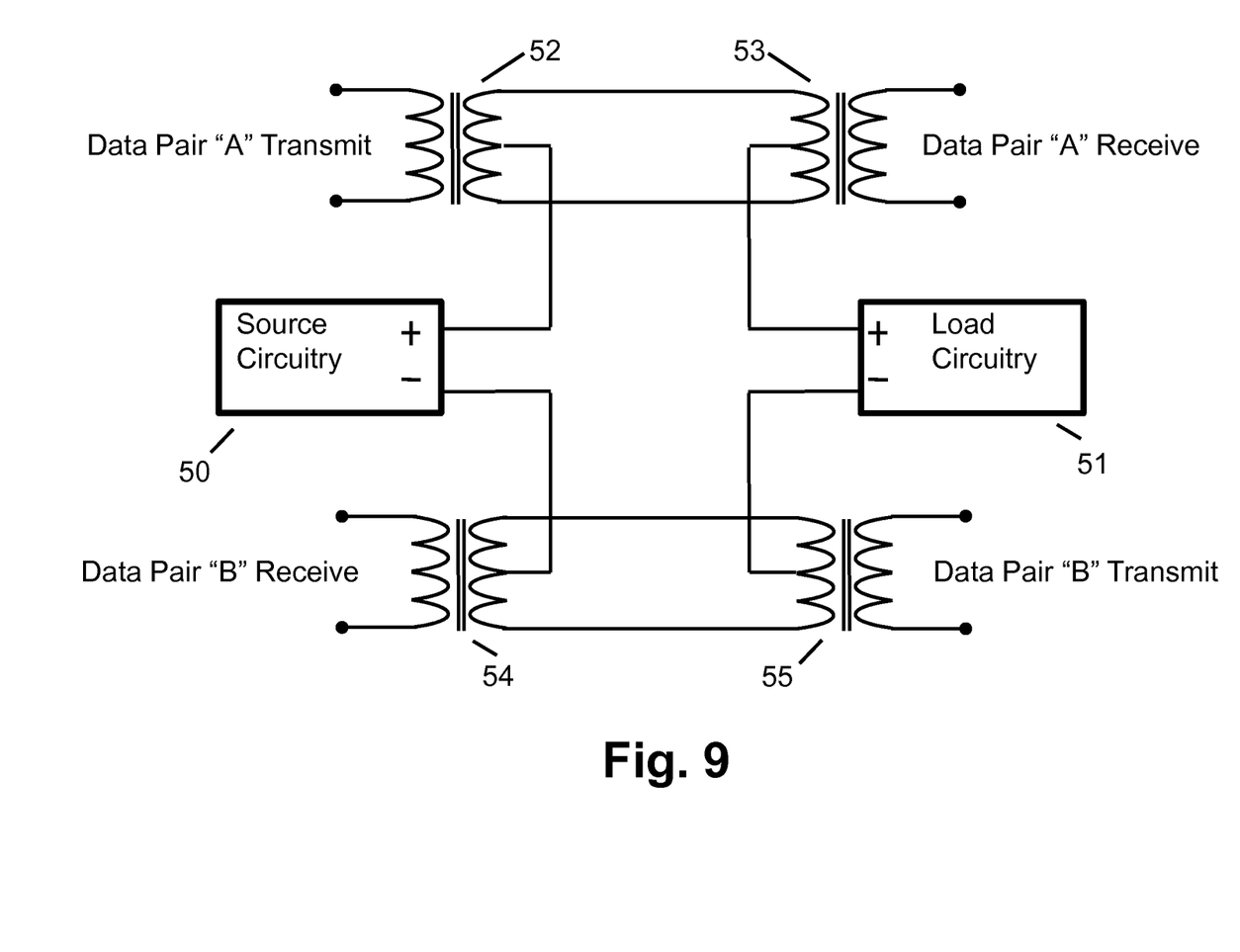
FIG. 9 is a diagram of using center-tapped isolation transformers to combine user data and power on common twisted pair cabling.

To allow simultaneous power transfer and user-data communications, the system can be configured as depicted in FIG. 9. In one example, a CAT 5 communication cable is used to transfer ethernet data between an end-user's computer and an ethernet switch; and the same cable conductors can be used to provide 400-600 Watts of power to the computer, itself, using the methods described herein. Referring to FIG. 9, source circuitry 50 can include all of the source components; or, referring to FIG. 1, the source circuitry can include source 1, source controller 5, source disconnect device 7 and all related source components. Load Circuitry 51 can represents all of the load components; or, referring to FIG. 1, the load circuitry 51 can include load 3, load controller 9, load disconnect device 13 and all related load components. The output conductors of source circuitry 50 are applied to the center tap points of isolation transformers 52 and 54 on the source side of the configuration. Corresponding center tap points on isolation transformers 53 and 55 are on the load side of the configuration and are electrically connected to center points on transformers 52 and 54 through the transformer windings. On the source side, ethernet data can be applied to the windings of transformers 52 and 54 that are electrically isolated from the center-tapped side using a balanced conductor pair configuration that is well known to those in the industry. On the load side, the pairs are picked up on the corresponding windings of transformers 53 and 55 that are electrically isolated from the center-tapped side containing the power. Because the power is essentially direct current, it passes through the transformers on the source side to the load side without causing magnetic excitation and, therefore, does not corrupt the data that is also resident on the communication lines. The described hardware configuration of center-tapped transformers is commonly used in the industry for implementing power over ethernet (PoE) as is described in PoE standard IEEE-802.3a. PoE does not have the safety features, described herein, and is therefore limited to approximately 48V to avoid the possibility of electrical shock.

Thus the scope of the disclosed invention should be determined by the appended claims and their legal equivalents, rather than the examples given. In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. Still further, the components, steps and features identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

I claim:

1. A power distribution system for regulating transfer of energy from a source on a source side and including source terminals to a load on a load side and including load terminals, the system comprising:
   a) a source controller on the source side of the power distribution system responsive to a source sensor that provides feedback to the source controller that includes at least a signal indicative of a voltage across the source terminals;
   b) a source disconnect device responsive to a control signal from the source controller for electrically connecting or disconnecting the source from the source terminals, wherein the source controller is configured to periodically interrupt the supply of power to the load by opening the source disconnect device, allowing at least the source terminal voltage to be measured during the-interrupted interval;
   c) a load disconnect device for electrically decoupling the load from the load terminals; and
   d) a logic device implemented in at least the source controller configured to open the source disconnect device and then to perform at least one source terminal voltage measurement when the disconnect device is opened, wherein the voltage measurement is representative of impedance between the source terminals and a corresponding discharge rate of capacitance between the source terminals and to determine whether a predetermined set of conditions that includes at least whether the voltage measurement falls outside of predetermined high and low limits, wherein a voltage measurement outside of the predetermined high and low limits indicates that there is a foreign object or individual making contact with the source or load terminals or a failure in the power distribution system, and to only close the source disconnect device if the voltage measurement falls within the predetermined high and low limits.

2. The power distribution system of claim 1, further comprising a load controller on the load side of the power distribution system responsive to a load sensor that provides feedback to the load controller that includes at least a signal indicative of the voltage across the load terminals.

3. The power distribution system of claim 2, further comprising a data communication link configured to exchange operating information between the source controller and the load controller, wherein the operating information includes at least a value indicative of the voltage across the load terminals that is acquired by the load controller.

4. The power distribution system of claim 3, wherein the data communication link comprises wireless communication circuits operating at carrier frequencies within an electromagnetic spectrum allowed by federal regulators.

5. The power distribution system of claim 3, wherein the data communication is accomplished by a modem in the source and load controllers that are operable to combine a communication signal with voltage waveforms present on the source or load terminals, and to later separate the communication signal from the voltage waveforms present on the source or load terminals, such that the source and load controllers can communicate with each other using only connections between the source and load terminals.

6. The power distribution system of claim 3, wherein the source and load controllers exchange a digital verification code that must match a predetermined value before energy transfer can be initiated.

7. The power distribution system of claim 2, wherein the source controller is configured to calculate the difference between the source terminal voltage acquired by the source controller and the load terminal voltage acquired by the load controller and to issue a command to open the source disconnect device if the difference does not fall between predetermined high and low values.

8. The power distribution system of claim 1, wherein the source disconnect device is responsive to a control signal from the source controller to vary the ratio of time that the source is connected to the source terminals in relationship to the time the source is disconnected from the source terminals so as to regulate the average energy transferred from the source to the load.

9. The power distribution system of claim 1, further comprising a current sensor that allows the source controller to acquire a signal indicative of the electrical current flowing from the source to the source terminals, and wherein the source controller is configured to open the source disconnect device to disconnect the source from the source terminals if the electrical current exceeds a predetermined maximum value.

10. The power distribution system of claim 9, wherein the source controller is configured to periodically multiply the source terminal voltage measurements with the source current measurements resulting in a calculated instantaneous power value and to integrate consecutive power values to derive a total energy value.

11. The power distribution system of claim 10, wherein the source controller is also configured to apply a financial charge to the user for energy extracted from the source.

12. The source disconnect device of claim 1, wherein the source disconnect device is configured to open the source disconnect device to substantially increase the impedance between the source and the source terminals to substantially diminish electric current from the source to the source terminals.

13. A method for implementing a power distribution system for the transfer of energy from a source to a load, where the power distribution system is configured to detect unsafe conditions that include electrically conducting foreign objects or individuals that have come in contact with exposed conductors in the power distribution system, the method comprising the steps of:
  a) generating a responsive signal in a source controller to open a source disconnect device, resulting in interruption of an electrical connection between the source and source terminals;
  b) following the opening of the source disconnect device, acquiring a first measurement of voltage across the source terminals using source terminal voltage sensors, and storing the first voltage measurement for access by the source controller;
  c) after a predetermined time has expired, acquiring a second measurement of the voltage of the source terminals using the source terminal voltage sensor and storing the second voltage measurement for access by the source controller;
  d) calculating a difference between the first stored voltage measurement and the second stored voltage measurement, wherein the difference represents a discharge rate of the capacitance across the source and load and terminals; and
  e) generating signals from the source controller to close the source disconnect device if the difference between the first stored voltage measurement and the second stored voltage measurement falls within predetermined high and low limits, wherein a discharge rate outside of the predetermined high and low limits indicates that there is a conducting foreign object or individual making electrical contact with the source or load terminals, or a failure in the power distribution system hardware.

14. The method of claim 13, wherein the source controller communicates with the load controller using at least one of an optical, conductive and wireless communication link.

15. The method of claim 14, wherein the source controller acquires a digital verification code from the load controller via the communication link and acts cause the source disconnect to remain in an open state if the digital verification code does not match a previously stored code resident in memory of the source controller.

16. The method of claim 13, wherein the source controller acts to vary the conductive time period of the source disconnect device in relation to the non-conductive time period of the source disconnect device such that the average energy transferred from the source to the load can be regulated according to an algorithm being executed by the source controller.

17. The method of claim 13, further comprising:
  f) executing code in the source controller to acquire a measurement of the electrical current flowing through the source terminals using a current sensor;
  g) storing the electrical current value in the source controller memory; and h) opening the source disconnect device to disconnect the source from the source terminals if the electrical current exceeds a predetermined maximum value.

18. The method of claim 13, further comprising executing an algorithm in the source controller to calculate the difference between the source terminal voltage acquired by the source controller using the source terminal voltage sensor and the load terminal voltage acquired by the source controller from the load controller, and acting to open the source disconnect device if the difference between the source terminal voltage and the load terminal voltage does not fall between predetermined high and low limits.

19. The method of claim 13, further comprising, at the source controller:
f) acquiring a measurement of the electrical current flowing through the source terminals using a current sensor;
g) acquiring a measurement of the source terminal voltage using a voltage sensor;
h) periodically multiplying the source terminal voltage measurements by the source current measurements to derive an instantaneous power value; and
i) integrating consecutive calculated power values with respect to time to derive a total energy value.

20. The method of claim 19, further comprising applying a financial charge to a user of the energy for energy extracted by the user from the source.

21. The method of claim 13, wherein the source controller acquires a first measurement of the source terminal voltage using a voltage sensor while the source disconnect means is closed then acquires a second measurement of the source terminal voltage immediately after the source disconnect is opened and computes the difference between the first and second voltage measurement, and where the source controller takes action to open the source disconnect if the voltage difference falls outside of predetermined high or low limits.

22. The method of claim 21, wherein the source controller also acquires a measurement of the electrical current flowing through the source terminals using the current sensor while the source disconnect is closed, and divides the voltage difference by the current measurement to derive a value for the resistance of the conductors between the source terminals and the load terminals, and where the source controller takes action to open the source disconnect if the resistance value falls outside of predetermined high and low limits.

23. The method of claim 13, further comprising connecting a first source circuitry output conductor to a center tap point on a secondary coil of a first isolation transformer and connecting a second source circuitry output conductor to a center tap point on a secondary coil of a second isolation transformer, and where a first load circuitry input conductor is connected to a center tap point on a primary coil of a third isolation transformer and a second load circuitry input conductor is connected to a center tap point of a primary coil on a fourth isolation transformer, such that the configuration substantially cancels any flux produced in the four transformers due to current flowing from the source circuitry to the load circuitry, and where the remaining unused terminals of the four transformers can be used to transmit and receive data that is electrically isolated and independent of electrical current flowing from the source circuitry to the load circuitry.

24. The power distribution system of claim 5, wherein the data communication is accomplished only when the source is disconnected from the source terminals, wherein the communication signals are not disrupted by electrical current flowing from the source terminals to the load terminals.

25. The power distribution system of claim 1, wherein the load disconnect device comprises a diode.

26. The method of claim 23, wherein the data is communicated using Ethernet technology.

27. The method of claim 23, wherein the data is communicated using Digital Subscriber Line technology.

28. The method of claim 13, further comprising having the source assume functions of the load and having the load assume functions of the source, resulting in a reversal of energy flow in the system.

* * * * *